(12) United States Patent
Larkin et al.

(10) Patent No.: US 8,443,358 B1
(45) Date of Patent: May 14, 2013

(54) HOT PLUGGABLE VIRTUAL MACHINE

(75) Inventors: Michael K. Larkin, San Jose, CA (US);
Kiran Kamity, Santa Clara, CA (US);
Shanmuga Appajodu, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1663 days.

(21) Appl. No.: 11/525,726

(22) Filed: Sep. 22, 2006

Related U.S. Application Data

(60) Provisional application No. 60/771,998, filed on Feb. 10, 2006, provisional application No. 60/772,000, filed on Feb. 10, 2006, provisional application No. 60/772,001, filed on Feb. 10, 2006, provisional application No. 60/772,002, filed on Feb. 10, 2006, provisional application No. 60/811,572, filed on Jun. 6, 2006, provisional application No. 60/811,582, filed on Jun. 6, 2006, provisional application No. 60/811,591, filed on Jun. 6, 2006.

(51) Int. Cl.
*G06F 9/445* (2006.01)
*G06F 9/44* (2006.01)

(52) U.S. Cl.
USPC .......................... 717/174; 717/172; 717/175

(58) Field of Classification Search .............. 718/1, 104, 718/107, 108; 717/169–175; 709/203–204
See application file for complete search history.

(56) References Cited

U.S. PATENT DOCUMENTS

| 5,835,713 | A | * | 11/1998 | FitzPatrick et al. | 709/204 |
|---|---|---|---|---|---|
| 6,816,882 | B1 | * | 11/2004 | Conner et al. | 709/203 |
| 6,922,831 | B1 | * | 7/2005 | Kroening et al. | 717/172 |
| 6,947,965 | B2 | | 9/2005 | Glass | |
| 6,970,866 | B1 | | 11/2005 | Pravetz et al. | |
| 7,143,408 | B2 | * | 11/2006 | Anderson et al. | 717/175 |
| 7,320,024 | B2 | | 1/2008 | Oku | |
| 7,356,679 | B1 | * | 4/2008 | Le et al. | 713/1 |
| 7,395,534 | B2 | * | 7/2008 | Alcazar et al. | 717/174 |
| 7,398,524 | B2 | * | 7/2008 | Shapiro | 717/175 |
| 7,424,709 | B2 | | 9/2008 | Neiger et al. | |
| 7,506,338 | B2 | * | 3/2009 | Alpern et al. | 717/177 |
| 7,562,346 | B2 | * | 7/2009 | Jhanwar et al. | 717/120 |
| 7,761,867 | B2 | * | 7/2010 | Goetz et al. | 717/174 |
| 7,941,797 | B2 | * | 5/2011 | Gupta et al. | 717/170 |
| 8,156,485 | B2 | * | 4/2012 | Jordan et al. | 717/168 |
| 2002/0010756 | A1 | | 1/2002 | Oku | |
| 2002/0147810 | A1 | | 10/2002 | Traversat et al. | |
| 2003/0028612 | A1 | | 2/2003 | Lin et al. | |
| 2003/0054810 | A1 | | 3/2003 | Chen et al. | |
| 2004/0179537 | A1 | | 9/2004 | Boyd et al. | |
| 2005/0004968 | A1 | | 1/2005 | Mononen et al. | |

(Continued)

OTHER PUBLICATIONS

Sapuntzakis, S. P. et al., "Optimizing the Migration of Virtual Computer," 2002, ACM SIGOPS Operating Systems Review, vol. 36, pp. 377-390.*

(Continued)

*Primary Examiner* — Anil Khatri
(74) *Attorney, Agent, or Firm* — Banner & Witcoff, Ltd.

(57) ABSTRACT

An exemplary method for a hot pluggable virtual machine comprises authenticating a user within an active host environment on a host device, executing a virtual machine driver, configuring a guest environment, and activating the guest environment for the virtual machine on the host device.

18 Claims, 5 Drawing Sheets

U.S. PATENT DOCUMENTS

| | | | |
|---|---|---|---|
| 2005/0021695 | A1 | 1/2005 | Takamine |
| 2005/0021788 | A1 | 1/2005 | Tucker et al. |
| 2005/0114448 | A1 | 5/2005 | Skomra |
| 2005/0246453 | A1 | 11/2005 | Erlingsson et al. |
| 2005/0289216 | A1 | 12/2005 | Myka et al. |
| 2006/0021029 | A1 | 1/2006 | Brickell et al. |
| 2006/0155931 | A1* | 7/2006 | Birrell et al. .................. 711/115 |
| 2007/0050770 | A1 | 3/2007 | Geisinger |
| 2009/0025006 | A1 | 1/2009 | Waldspurger |

OTHER PUBLICATIONS

Su et al,"Development of data pre processing scheme and pluggable appliation modules for an intelligent equipment prognostic system", IEEE, pp. 38-43, 2005.*

Dietl et al,"Buildiing and using pluggable type checkers" ACM ICSE, pp. 681-690, 2011.*

Markstrum et al, "JavaCOP: Declarative pluggable types for Java", ACM Trans. on Prog. and Sys. vol. 32, No. 2, article 4, pp. 1-37, 2010.*

Villazon et al, "Major: Rapid tool development with aspect oriented programming", ACM PPPJ, pp. 125-128, 2009.*

U.S. Appl. No. 11/525,888, Michael Larkin et al., Intelligent Resource Management for a Virtual Machine, filed Sep. 22, 2006.

U.S. Appl. No. 12/002,725, Shanmuga Appajodu, Systems and Methods for Decentralized Computing, filed Dec. 17, 2007.

U.S. Appl. No. 11/516,179, Aaron Slettehaugh, System and Method of Providing Mobility to Personal Computers, filed Sep. 6, 2006.

* cited by examiner

HOT PLUGGABLE VIRTUAL MACHINE

CROSS-REFERENCE TO RELATED APPLICATIONS

This U.S. nonprovisional patent application claims the benefit of U.S. Provisional Patent Application Ser. No. 60/811,582, filed on Jun. 6, 2006, entitled "Systems and Methods for a Hot Pluggable Virtual Machine," U.S. Provisional Patent Application No. 60/811,591, filed on Jun. 6, 2006, entitled "Intelligent Resource Management for a Virtual Machine," U.S. Provisional Patent Application No. 60/811,572, filed on Jun. 6, 2006, entitled "Intelligent Resource Management using a Dynamic Table for a Virtual Machine," U.S. Provisional Patent Application No. 60/771,998, filed on Feb. 10, 2006, entitled "Dynamic Table System," U.S. Provisional Patent Application No. 60/772,000, filed on Feb. 10, 2006, entitled "System and Method For Virtualizing An Operating System," U.S. Provisional Patent Application No. 60/772,001, filed on Feb. 10, 2006, entitled "Hot Pluggable/Transportable Virtual Environment," and U.S. Provisional Patent Application No. 60/772,002, filed on Feb. 10, 2006, entitled "Intelligent Resource Management for a Virtual Machine", which are all incorporated herein.

The present application is related to U.S. Nonprovisional patent application Ser. No. 11/525,888, filed on Sep. 22, 2006, entitled "Intelligent Resource Management for a Virtual Machine," and U.S. Nonprovisional patent application Ser. No. 11/525,727, filed on Sep. 22, 2006, entitled "Dynamic Table Configuration in a Virtual Machine," which are also incorporated herein.

BACKGROUND OF THE INVENTION

1. Field of the Invention

The present invention relates generally to the field of virtual machines, and more particularly to hot pluggable virtual machines.

2. Description of Related Art

Virtual machines allow a computer to simultaneously support and execute two or more computing environments. A computer environment comprises the operating system as well as user applications and data. A virtual machine is configured to emulate computing resources such as CPU, disk, and memory from a host computer and co-exist alongside the host computer as a guest computer.

Due to a large software footprint, current virtual machines can not be easily transported from one host computer to another host computer. Unfortunately, the installation and operation of a virtual machine within a host environment may significantly alter the host environment and associated file system (e.g., installation of files on the computer to execute the virtual machine.) If the virtual machine is transported to a different host environment without the installation of necessary files, the virtual machine may not function since necessary files and resources may not be present within the operating system or hardware of the host environment. As a result, each computer may be significantly altered by the execution of a portable virtual machine.

As such, there exists a need for a portable virtual machine that may depend on access to required files without significantly altering the host computer or host environment. Further, there exists a need for the resources on the guest computer to be isolated from the resources on the host computer, and vice-versa, to reduce the effect of the virtual machine on the host environment.

SUMMARY OF THE INVENTION

Various embodiments of the present invention include methods, systems, and software for a hot pluggable virtual machine by providing for reconfiguration capabilities and the encapsulation of guest resources within the virtual machine. In various embodiments, programs for the guest environment are contained in a hot, pluggable peripheral device. This peripheral device can be plugged into a computer running an active host environment. "Hot" installation and execution means that rebooting the computer is not required.

An exemplary method for the hot pluggable virtual machine comprises authenticating a user within an active host environment on a host device, executing a virtual machine driver, configuring a guest environment, and activating the guest environment for the virtual machine on the host device.

Installation may require user authentication for security and/or configuration purposes. Once a user has been authenticated, a driver may be executed, so that the peripheral device may communicate with the host. The guest computing environment for the virtual machine can then configured to allow for interaction between the guest and the host computer and activated.

In various embodiments, the guest environment may include an operating system instance. A guest registry may be loaded onto the host device for efficient resource management. The virtual machine driver may be stored on the portable guest device. Further, the guest environment may comprise emulation of hardware of the host device. The method may also comprise installing software within the guest environment without altering a file system of the host device.

In exemplary embodiments, a software product for a hot pluggable virtual machine comprises software operational when executed by a processor to authenticate a user within an active host environment on a host device, execute a virtual machine driver, configure a guest environment, and activate the guest environment for the virtual machine on the host device and a storage medium configured to store the software.

An exemplary system for a hot pluggable virtual machine comprises a memory and a processor. The memory is configured to store data. The processor is configured to authenticate a user within an active host environment on a host device, execute a virtual machine driver, configure a guest environment, and activate the guest environment for the virtual machine on the host device.

DETAILED DESCRIPTION OF THE INVENTION

Figure 1:
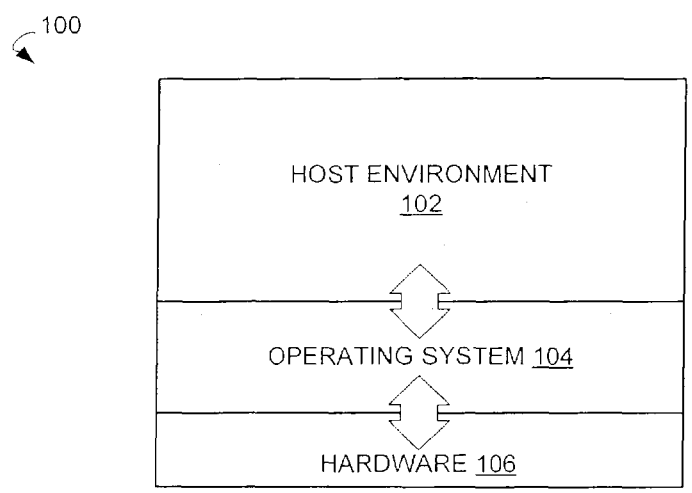
FIG. 1 is a block illustration of a host computer, as found in the prior art.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

Various embodiments include methods, systems, and software for a hot pluggable virtual machine. In exemplary embodiments, a hot pluggable virtual machine is within a portable storage device such as a USB flash drive. When the USB flash drive is coupled to a digital device such as a computer, a virtual machine may generate a guest environment on the digital device.

The guest environment can comprise an operating system, applications, and a registry that can operate independently from the previously existing operating system and applications on the digital device. In some embodiments, the guest environment comprises applications (e.g., browsers or computer games) that may be used by the user that are not otherwise available on the digital device. The guest environment may be created or terminated without affecting the performance of the operating system or applications within the digital device.

Each virtual machine may have its own set of virtual hardware (e.g., RAM, CPU, NIC) upon which an operating system and applications may be loaded. The operating system may see a consistent, normalized set of hardware regardless of the actual physical hardware components of the host digital device. Virtual machines may be encapsulated into files, making it possible to rapidly save, copy, and provision a virtual machine.

Virtual machine capabilities allow a computer system's resources to be shared or emulated between several system programs. This can allow for the host computer system's resources to be pooled and allocated as required to satisfy the needs of the aggregate program set. Operating systems, such as Windows or Linux, may provide the capability to balance resources among individual processes, but may lack the ability to isolate groups of processes from one another. In various embodiments, a virtual machine can isolate a group of processes, which allows for multiple groups of the same processes to be executed. As a result, multiple instances of operating systems may be executed simultaneously.

A virtual machine is hot and pluggable if it can be plugged into and/or removed from a host computer without having to shut down or reset the host computer. In other words, the virtual machine and the associated guest environment can be seamlessly installed and executed. This hot pluggability characteristic is a benefit to the functionality of a portable virtual machine, which can encapsulate the guest environment.

In various embodiments, hot pluggable virtual machines can adapt to one or more given host environments. Such adaptation may include reconfiguring guest settings for new hosts. Reconfiguration may require configuring the guest's operating system resources and/or enabling/disabling hardware support. Configuring operating system resources may be done by matching old operating system resources to new operating system resources through intelligent table mapping, which queries and maps corresponding system resources, including associated metadata. (The process of matching old operating system resources to new operating system resources is further discussed in U.S. patent application Ser. No. 11/525,727, entitled "Dynamic Table Configuration in a Virtual Machine", filed Sep. 22, 2006, which is hereby incorporated by reference.)

A virtual machine can execute a virtual computing environment on a computer or any digital device. A digital device is any device with a processor including, but not limited to computers, cellular telephones, and personal digital assistants. The virtual computing environment may appear as a separate computer running on the same digital device as the host environment. Virtual machines can allow a computer to execute two or more computing environments (i.e., the host's and one or more guest computers' environment) simultaneously. The host computing environment and the guest computing environment may share various computing resources, such as, for example, a central processing unit (CPU), memory, and a keyboard. However, each computing environment may be operated separately or isolated from the other.

Isolation refers to the virtual separation of a guest environment from the host environment. For example, when a guest environment runs a software application, that software application is invisible to other environments, including the host environment. That software application may use common resources, but its processes do not affect the host or other guest computers. In some embodiments, viruses or bugs on a virtual machine are contained within that virtual machine and do not have any adverse effect on the host environment.

FIG. 1 is a block illustration of a host system 100, as found in the prior art. The host system 100 comprises, a host environment 102, an operating system 104, and hardware 106. The host environment 102 receives instruction from and transmits instructions to the operating system 104. The operating system 104 receives data and transmits instructions to the hardware 106.

The host environment 102 comprises, for example, user applications and data files stored within a host memory. The host memory is further discussed in FIG. 3. The host environment 102 may further access, for example, library files, configuration files, registries and/or or kernel objects. The operating system 104 may comprise, for example, Windows® or Linux®. The hardware 106 includes hardware resources such as ports, processors, memory, and input/output devices including, for example, a display, speakers, printers, a keyboard, and/or a mouse. In operation, a user may operate the host system 100 as if the host system 100 is a personal computer without a virtual machine. The host environment 102 may be substantially unaffected by the presence of a virtual machine.

Figure 2:
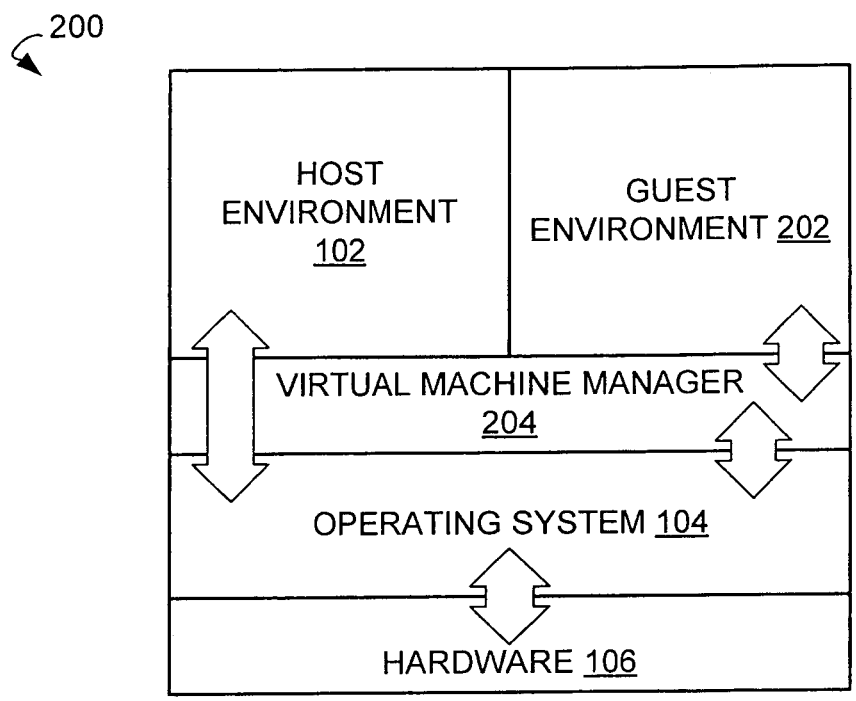
FIG. 2 is a block illustration of an exemplary implementation of the present invention on a host computer, according to various embodiments.

FIG. 2 depicts a host computer 200 comprising a virtual machine according to an exemplary implementation of the invention. The host computer 200 uses the operating system 104 and the hardware 106 of host system 100 (FIG. 1) to execute applications within a guest environment 202. The host computer 200 may comprise the host environment 102, the operating system 104, the hardware 106, a guest environment 202, and a virtual machine manager 204. Although a single guest environment 202 is depicted in FIG. 2, any number of guest environments 202 may operate simultaneously during a given time.

The guest environment 202 receives instructions from and transmits instructions to the virtual machine manager 204. The virtual machine manager 204 can interrupt instructions between the operating system 104, the portable storage device (i.e., guest memory discussed in FIG. 3), the host environment 102, and the guest environment 202. In various embodiments, the guest environment 202 may depend upon resources and/or files that may be available within the host computer 202 and/or the portable storage device. The virtual machine manager 204 may analyze the commands between the operating system 104, host environment 102, and guest environment 202, to control whether resources within the host computer 200 or resources from the portable storage device should respond. (The process of matching old operating system resources to new operating system resources is further discussed in U.S. patent application Ser. No. 11/525,727, entitled "Dynamic Table Configuration in a Virtual Machine", filed Sep. 22, 2006, which is hereby incorporated by reference.) Further, the virtual machine manager 204 may coordinate existing resources, such as hardware 106, between the host environment 102 and the guest environment 202.

In some embodiments, the virtual machine manager 204 allows the guest environments 202 to access resources, while maintaining isolation of said resources for the host environment 102. Because guest resources may be isolated, a guest application may obtain the resources for the guest application's execution by submitting requests through the virtual machine manager 204.

The virtual machine manager 204 may act as a peer of the host computing environment 102 or may act autonomously from the host environment 102 and guest environment 202. The virtual machine manager 204 can function to isolate resources from each virtual machine guest environment 202 by intercepting requests for resources from each guest environment 202. These requests may be processed and then forwarded to the operating system 104. The operating system 104 allocates the requested resources, which are intercepted by the virtual machine manager 204 for processing before forwarding to the guest environment 202. In this manner, each guest environment 202 "sees" all the resources required for its applications, but some or all of these resources may exist as virtual resources and are not representative of resources on the host computer 200. Any changes that a guest makes to the resources, therefore, may not leak or affect the host computer 200, the host environment 102, or other guest environments 202. Resources may include traditional hardware resources, such as, for example, CPU, memory, disks, printers, input devices, and CRT, as well as software resources, such as include library files, configuration files, shared data, and the like.

Figure 3:
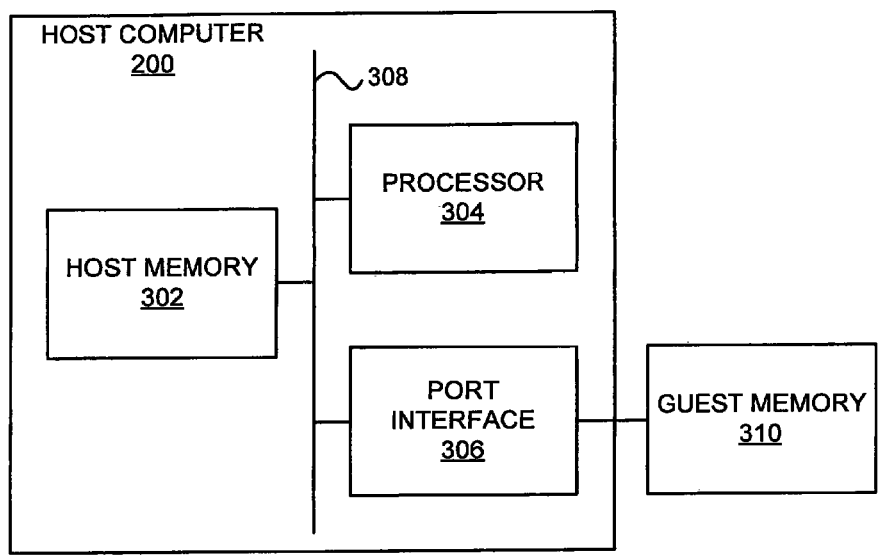
FIG. 3 is a block diagram of the components of the host computer, according to various embodiments of the present invention.

The files to generate the guest environment 202 may be stored within a guest memory (described in FIG. 3.) Files within guest environment 202 may comprise application files, data files, registry files, library files, configuration files, kernel objects, and/or cookies.

In some embodiments, the guest environment 202 operates as a paravirtualized virtual machine system, wherein individual guest environments 202 may maintain separate operating systems which communicate with the virtual machine manager 204. In one example, the host environment 102 and each guest environment 202 submits requests for resources through the virtual machine manager 204 which acts as an intermediary and coordinates resource, hardware, and file usage. In another example, specific hardware not present in the host computer 200 may be emulated in the paravirtualized virtual machine system for the use in one or more guest environments 202.

FIG. 3 is a block diagram of the components of the host computer 200, according to various embodiments of the present invention. The host computer 200 may be communicatively coupled to a guest memory 310 via the port interface 306. The bus 308 couples the host memory 302, the processor 304, and the port interface 306. In some embodiments, the host computer 200 comprises a personal computer. The host memory 302 can store files, applications, and resources in a memory such as a hard disk or RAM.

The port interface 306 allows for connections and data exchange with peripheral components (e.g., guest memory 310). Examples of peripheral components that may be connected to the host computer 200 using the port interface 306 include memory devices, such as flash memory, storage devices, USB drives, hard drives, CD drives, and DVD drives. The port interface 306 may comprise, for example, a Universal Serial Bus (USB) port. In exemplary embodiments, the guest memory 310 is portable and may be used within many host computers 300.

In various embodiments of the present invention, the guest memory 310 includes all the required data for setting up one or more guest environments 202 (FIG. 2), including various guest resources and/or a virtual machine manager 204 (FIG. 2). Once connected to the host computer 200 using the port interface 306, software present in the guest memory 308 may be activated to install and execute the guest environment 202. Some embodiments install the virtual machine manager 204 in host memory 302. In some embodiments, the virtual machine manager 204 remains in guest memory 308.

The guest environment 302 additionally comprises dynamic tables for determining whether to read files associated with the guest memory or the memory on the host machine 300. The dynamic tables may contain a list of resources associated with the operating system 104 (FIG. 2). In some embodiments, the list of resources corresponds to files stored on the memory of the host computer 200 or the guest memory 310. In some embodiments, the dynamic tables comprise a File Exception Table (FET) and a File Inclusion Table (FIT). The FET may indicate that a resource should be read from the host memory 302, and the FIT may indicate that a resource should be read from the guest memory 310.

The dynamic table entries indicate a file name having a standard hierarchical file structure in a table. For example, the file name "\WINDOWS\TEMP" may appear in the FIT and the file name "\WINDOWS" may appear in the FET. In this example, a file in "\WINDOWS\TEMP" will be read from the guest memory 310 but a file in "\WINDOWS\SYSTEM" will be read from the host memory 302. (The process of matching old operating system resources to new operating system resources is further discussed in U.S. patent application Ser. No. 11/525,727, entitled "Dynamic Table Configuration in a Virtual Machine", filed Sep. 22, 2006, which is hereby incorporated by reference.)

Figure 4:
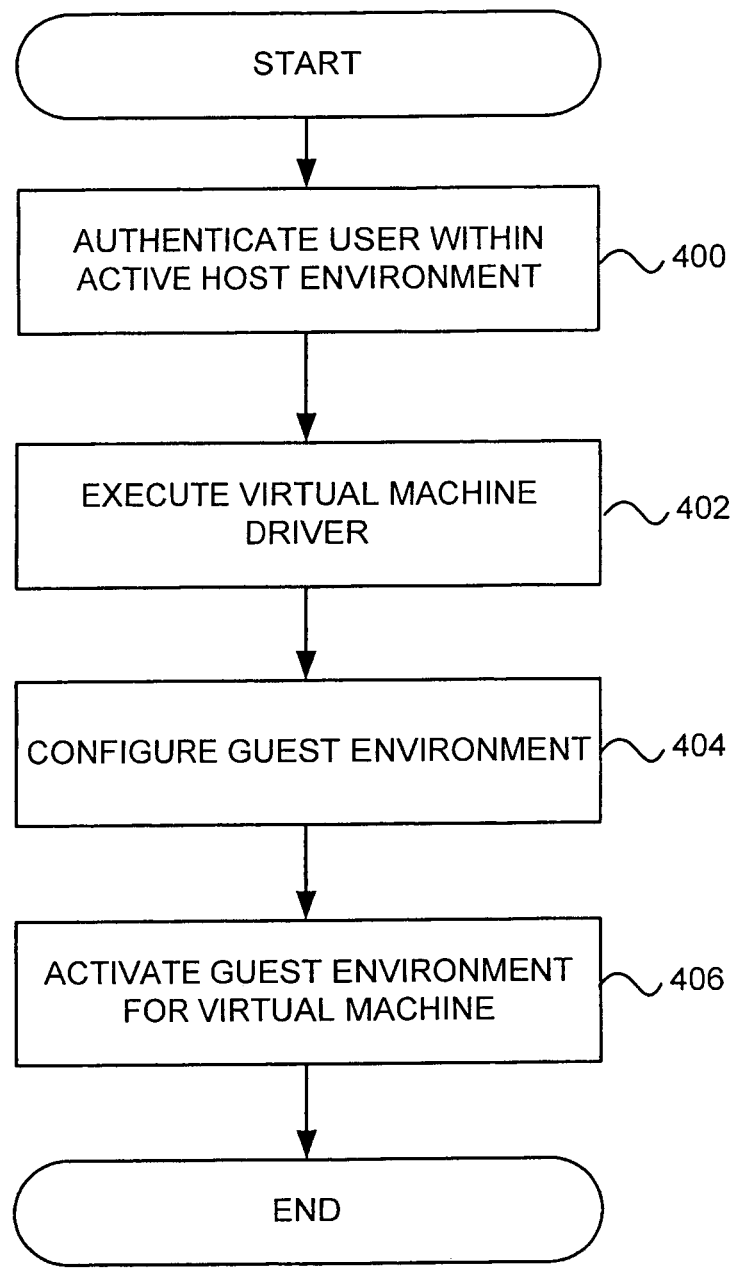
FIG. 4 is a flowchart depicting the installation and execution of an exemplary hot pluggable virtual machine, according to various embodiments of the present invention

FIG. 4 is a flowchart depicting the installation and execution of an exemplary hot pluggable virtual machine, according to various embodiments of the present invention. The hot pluggability characteristic allows the virtual machine, namely the guest environment 202 (FIG. 2), to be transferred easily and conveniently between various host computers 200 (FIG. 2). When the guest memory 310 (FIG. 3) is plugged, or otherwise coupled, to a port interface 306 (FIG. 3) on a host computer 200, the software present in the guest memory 310 may be activated. Upon activation, a user may be prompted to enter a username and/or password to be authenticated prior to the execution of the initiation of the guest environment 202.

In various embodiments, activation may occur automatically upon a user coupling the guest memory 310, or upon a user response to a prompt. Once the guest memory 310 is coupled to the host computer 200 or the virtual machine is otherwise activated, a device driver (e.g., a guest memory driver) may load and execute (e.g., autorun). The device driver may authenticate the user within the active host environment 102 (FIG. 2) in step 400. In one example, the device driver for the guest memory 310 loads into the host memory 302 and subsequently displays a message to the user to enter a username and a password. The username and password may be required for security as well as to customize configuration settings for the user within the virtual machine. The name and password may be compared to a name and password previously stored within the guest memory 310 before authenticating the user. If the user is not authenticated, the process may end.

In step 402, the guest memory 310 executes a virtual machine driver to configure and initiate the guest environment 202 and the virtual machine manager 204 (FIG. 2). In some embodiments, the virtual machine driver controls how the host computer 200 communicates with the guest environment 202. In some embodiments, the virtual machine driver is executed prior to the user authentication in step 400 and may comprise the device driver (e.g., the guest memory driver).

In step 404, the virtual machine driver configures the guest environment 202. For example, the virtual machine driver scans the available hardware and software of the host computer 200 (e.g., the hardware 106 (FIG. 2) and the operating system 204 (FIG. 2). In some embodiments, the virtual machine driver matches the names operating systems resources of the host computer 200 to the names of resources needed in the guest environment 202 or present within the guest memory 310.

One way to accomplish this is to use intelligent table mapping. Intelligent table mapping produces a table containing a list of corresponding resource names and associated metadata for the host environment 102 operating system 104 and the guest environment 202. For any given resource requested, intelligent table mapping can respond with the renamed resource, as it would be seen by the guest operating system within the guest environment 202. The table created by intelligent table mapping can be queried by the virtual machine manager 204 when a resource is required. Maintaining a map for various operating system resources can allow for the virtual machine manager 204 to rename resources or files as needed in a process called namespace virtualization. (The process of matching old operating system resources to new operating system resources is further discussed in U.S. patent application Ser. No. 11/525,727, entitled "Dynamic Table Configuration in a Virtual Machine", filed Sep. 22, 2006, which is hereby incorporated by reference.)

In some embodiments, the virtual machine manager 204 may enable or disable hardware support for the guest environment 202. A request for hardware resources may be passed through to the host computer 200 based on the type of hardware 106 requested.

The guest environment 202 is subsequently activated in step 406. In exemplary embodiments, a user can switch between the host environment 102 and the guest environment 202 without a performance impact between the two environments. In one example, Adobe Photoshop™ may be rendering an image in the host environment 102 while the user plays a graphic intensive game within the guest environment 202. These two applications within the separate environments may run independent of each other. If one program crashes, the other environment may continue to execute unaffected.

Figure 5:
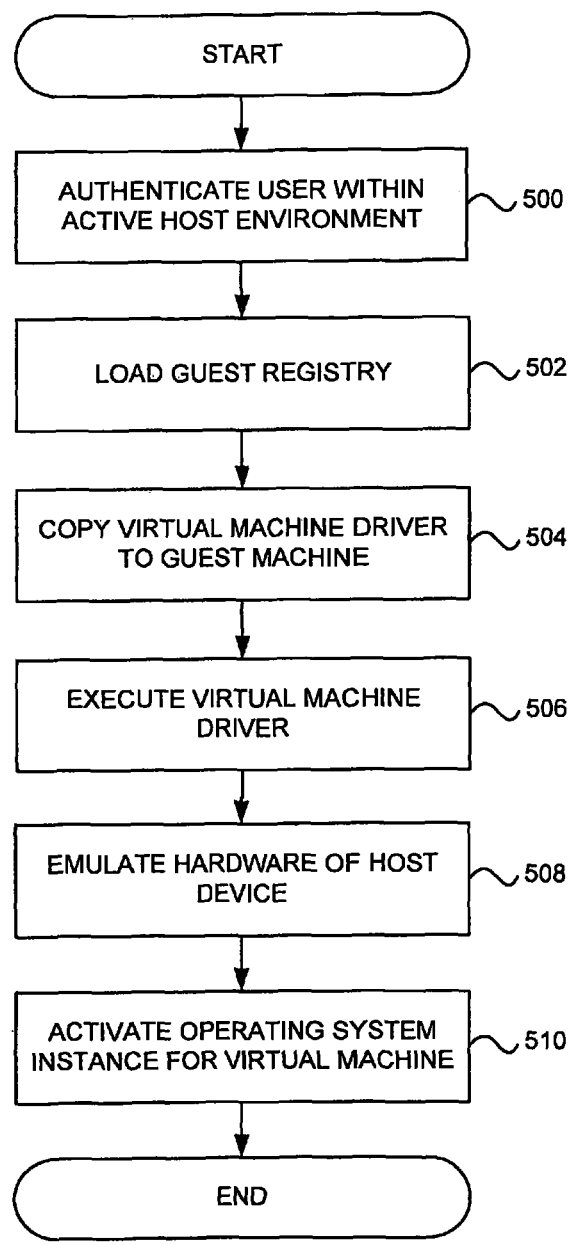
FIG. 5 is a flowchart depicting another example of installation and execution of a hot pluggable virtual machine, according to various embodiments of the present invention.

FIG. 5 is a flowchart depicting another example of installation and execution of a hot pluggable virtual machine, according to various embodiments of the present invention. In step 500, the guest memory 310 (FIG. 3) authenticates the user within the active host environment 102 (FIG. 2). Once the user is authenticated within the active host environment, the guest memory 310 loads a guest registry within the host memory 302 (FIG. 3).

A registry is a hierarchical database within an operating system used to store information necessary to configure the system for one or more users, applications, and hardware devices. In one example, a Microsoft Windows registry contains information that the Windows operating system continually references during operation, such as profiles for each user, the applications installed on the computer and the types of documents each can create property settings for folders and applications icons, what hardware exists on the system, and which ports are being used.

In exemplary embodiments, the guest registry comprises a database or other data structure which may be used to store information necessary to configure the host computer 200 (FIG. 2), the guest environment 202 (FIG. 2), and/or the virtual machine manager 204 (FIG. 2). In one example, the guest registry contains files and resources available within the guest memory 310. In some embodiments, the guest registry is configured to load data regarding the host computer 200, the hardware 106 (FIG. 2), the operating system 104 (FIG. 2), guest memory 310, and/or the host environment 102.

Some operating systems may provide software application programming interfaces (APIs) that programs can use to read and/or write configuration values to the registry. Communications to and from these application programming interfaces may be intercepted and transferred to the guest registry. The guest registry may also use intelligent table mapping to determine the names of files and resources requested by the APIs.

In various embodiments, a host computer 200 may play host to multiple guest environments 202. The multiple guest environments 202 can be organized by and their data stored in their respective guest registry to allow for faster and more efficient program execution of guest applications. In some embodiments, the multiple guest environments 202 may store data within a single guest registry.

In step 504, the guest memory 310 copies the virtual machine driver to the host machine 200. As discussed in FIG. 4, the virtual machine driver may be configured to prepare the host machine 200 to execute the guest environment 202, initiate the guest environment 202, and control the hardware of the guest memory 310. In step 506, the virtual machine driver is executed. The virtual machine driver can then initiate the guest environment 202.

In step 508, the virtual machine driver emulates hardware of the host machine 200. In one example, the virtual machine driver checks to see what hardware is available on the host computer 200. Hardware interfaces, digital devices, peripherals, CPU, RAM, and/or any other hardware may be emulated by the virtual machine.

In some embodiments, the hardware 106 (FIG. 2) on the host computer 200 is emulated. In one example, the guest environment 202 and the host environment 102 operate completely independent of each other and assume full access to the hardware 106. The virtual machine driver may also emulate hardware that is not present within the host computer 200 for use with the virtual machine.

The virtual machine manager 204 may emulate hardware by creating a virtual set of hardware resources for each guest environment 202 to use during execution of the guest environment's 202 applications, programs, or the like. Not only can the virtual machine manager 204 emulate the hardware resources of the host computer 200, but it can emulate hardware resources not present on the host computer 200 in various embodiments. In one example, instead of disabling features when the host computer 200 lacks certain hardware resources, the virtual machine manager 204 can emulate and provide the hardware features that are lacking on the host computer 200. This can be very useful on a mobile virtual machine that is transferred between host computers with different hardware features.

The operating system instance (e.g., guest environment 202) may be activated for the virtual machine in step 510. The operating system instance may by any operating system including, but not limited to, Linux, Windows, or Unix. Although activating only one operating system instance is discussed in step 510, many operating system instances may be activated. In one example, two operating system instances, one for Linux and the other for Windows, may be activated. Similarly, one or more of the guest environment(s) 202 may utilize the same brand of operating system 104 as the host environment 102. In another example, the host environment 102 utilizes a different operating system 104 than that used within the guest environments 202.

In various embodiments, the steps of FIG. 5 may be of a different order. In one example, the virtual machine driver may be copied to the host machine 200 (i.e., steps 504 and 506) before the user is authenticated. Those skilled in the art will appreciate that there may be many methods to install and execute a hot pluggable virtual machine.

The user may shut down the guest environment 202 through normal shut down procedures within the operating system instance(s). When the user shuts down (i.e., turns off) all of the guest environments 202 that were activated by the guest memory 310, the guest environment 202 can terminate, the virtual machine driver may unload, the guest registry removed, and the virtual machine manager 204 terminated. The guest memory 310 can then be removed and ultimately "plugged" into another host computer 200 without significantly altering a host environment 102.

In other examples, the guest memory 310 is physically decoupled from the host computer 200. In some embodiments, the guest environment 202 and virtual machine manager 204 terminate. The host environment 102, operating system 104, and the hardware 106 may not be effected by the termination of the guest environment or virtual machine.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for a hot pluggable virtual machine, the method comprising:
   executing instructions stored in memory by a processor to:
      authenticate a user within an active host environment on a host device;
      execute a virtual machine driver;
      configure a guest environment by:
      identifying hardware resources of the host device, and
      emulating logical and physical resources of the host device and hardware not present within the host device, by creating a virtual set of resources for the guest environment using the virtual machine driver;
      activate the guest environment for the hot pluggable virtual machine on the host device; and
      install software within the guest environment without altering a file system of the host device.

2. The method of claim 1, further comprising executing instructions stored in memory by the processor to load a guest registry for intelligent resource management.

3. The method of claim 1, further comprising executing instructions stored in memory by the processor to copy the virtual machine driver to the host device.

4. The method of claim 1, wherein the virtual machine driver is stored within a portable guest device.

5. The method of claim 1, wherein the guest environment comprises an operating system instance.

6. The method of claim 1, wherein executing instructions stored in memory by the processor to configure the guest environment further comprises matching names of operating system resources of the host device to names of resources needed in the guest environment or present within a guest memory, the matching comprising using a table produced by intelligent table mapping, the table comprising a list of resource names and associated metadata for the host environment operating system and the guest environment.

7. A non-transitory computer readable storage medium having embodied thereon a program, the program being executable by a processor to perform a method for a hot pluggable virtual machine, the method comprising:
   authenticating a user within an active host environment on a host device;
   executing a virtual machine driver;
   configuring a guest environment, wherein configuring the guest environment comprises:
   identifying hardware resources of the host device, and
   emulating logical and physical resources of the host device and hardware not present within the host device, by creating a virtual set of resources for the guest environment using the virtual machine driver; activating the guest environment for the hot pluggable virtual machine on the host device; and
   installing software within the guest environment without altering a file system of the host device.

8. The computer readable storage medium of claim 7, wherein the method further comprises loading a guest registry for intelligent resource management.

9. The computer readable storage medium of claim 7, wherein the method further comprises copying the virtual machine driver to the host device.

10. The computer readable storage medium of claim 7, wherein the computer readable storage medium is stored within a portable guest device.

11. The computer readable storage medium of claim 7, wherein the guest environment comprises an operating system instance.

12. The computer readable storage medium of claim 7, wherein configuring the guest environment further comprises matching names of operating system resources of the host device to names of resources needed in the guest environment or present within a guest memory, the matching comprising using a table produced by intelligent table mapping, the table comprising a list of resource names and associated metadata for the host environment operating system and the guest environment.

13. A system for a hot pluggable virtual machine, the system comprising:
   a memory configured to store data; and
   a processor configured to execute instructions stored in the memory to:
      authenticate a user within an active host environment on a host device;
      execute a virtual machine driver;
      configure a guest environment by:
      identifying hardware resources of the host device, and
      emulating logical and physical resources of the host device and hardware not present within the host device, by creating a virtual set of resources for the guest environment using the virtual machine driver;
      activate the guest environment for the hot pluggable virtual machine on the host device; and install software within the guest environment without altering a file system of the host device.

14. The system of claim 13, wherein the processor is further configured to execute instructions stored in the memory to load a guest registry for intelligent resource management.

15. The system of claim 13, wherein the processor is further configured to execute instructions stored in the memory to copy the virtual machine driver to the host device.

16. The system of claim 13, wherein the memory is stored within a portable guest device.

17. The system of claim 13, wherein the guest environment comprises an operating system instance.

18. The system of claim 13, wherein the processor is further configured to execute instructions stored in the memory to configure the guest environment by matching names of operating system resources of the host device to names of resources needed in the guest environment or present within a guest memory, the matching comprising using a table produced by intelligent table mapping, the table comprising a list of resource names and associated metadata for the host environment operating system and the guest environment.

\* \* \* \* \*